INVENTOR
Marcel Jean Joseph Malchaire

BY

ATTORNEYS

United States Patent Office 3,423,565
Patented Jan. 21, 1969

3,423,565
COATED ELECTRODE AND PROCESS FOR ELECTRIC ARC WELDING
Marcel Jean Joseph Malchaire, Forest, Belgium, assignor to La Soudure Electrique Autogene, Procedes Arcos, Brussels, Belgium, a corporation of Belgium
Filed May 18, 1966, Ser. No. 551,149
Claims priority, application Belgium, May 31, 1965, 13,478
U.S. Cl. 219—146   16 Claims
Int. Cl. B23k 35/22

ABSTRACT OF THE DISCLOSURE

An electrode and process, the electrode having a metallic core and a basic coating for electric arc welding between a vertical plate and horizontal plate in alloy or carbon steel, the coating having a coefficient of basicity higher than two and containing metallic powder, dioxidizer and fluorinated fluidizer, the coating having sufficient metallic powder to have an electrode efficiency higher than 150%, having an outside diameter at least 1.9 times its core diameter, and there being a greater weight of magnesium compounds among the basic chemical compounds than the sum of the weights of other basic alkaline earth and alkali compounds.

---

The present invention concerns an electrode with a basic coating for electric arc welding of a vertical plate and a horizontal plate of alloy steel or carbon steel, where the coating has a basicity coefficient higher than two and contains metallic powder, deoxidizers, fluorinated fluidizers and in some cases organic materials.

In the present specification, basicity coefficient of the coating of a basic coated electrode means the ratio of the total content in the coating of ingredients having a basic chemical function, such as oxides of alkali and alkaline earth metals, including magnesium oxide, which is sometimes considered by welders as not being an oxide of an alkaline earth metal, to the total content of ingredients having an acidic chemical function such as $SiO_2$, $TiO_2$, and $ZrO_2$ expressed in gram molecules (moles).

The efficiency of an electrode means the ratio expressed in percent of the weight of the weld metal deposited to the weight of the metallic core being melted exclusive of the coating containing metallic powder being melted.

Metallic powder means iron powder and, where used, alloying metals incorporated in the deposited weld metal.

Electrodes with a basic coating of the above-mentioned type are known where ingredients having a basic chemical function in the coating consist mainly of alkaline earth carbonates. Generally, the basic character of the coating is obtained essentially from calcium carbonate, and sometimes the coating contains also magnesium carbonate, but in this case, the content of magnesium carbonate is much lower than that of the other alkaline earth carbonates and does not exceed more than ⅓ of the other alkaline earth carbonates.

The drawings illustrate the weld of the invention in comparison to welds of the prior art, and also curves useful in explaining the invention.

Figure 3:
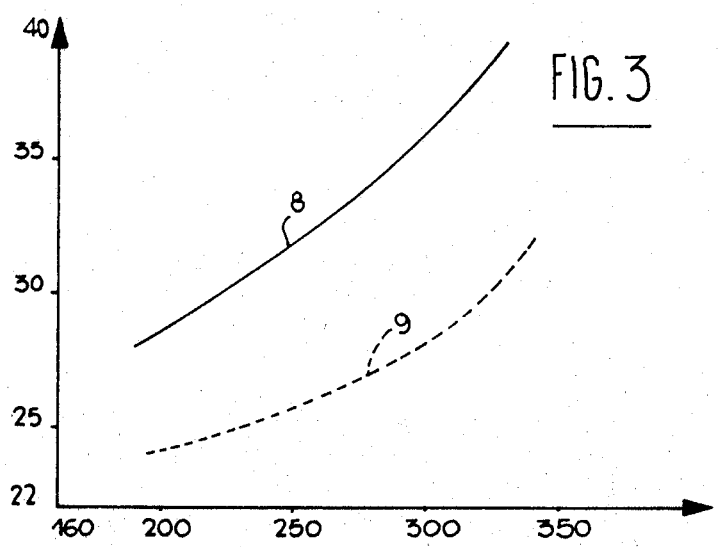

FIGURE 3 plots arc voltage in volts as the ordinate against intensity of welding current in amperes as the abscissa.

Figure 4:
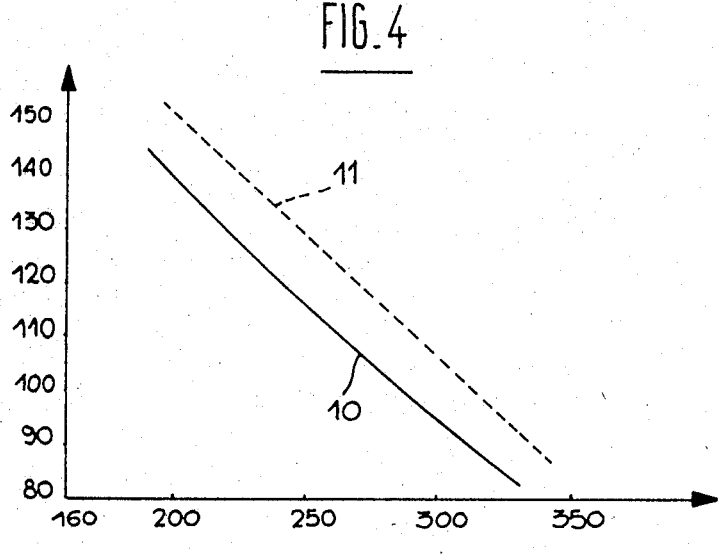

FIGURE 4 plots the time of melting in seconds as ordinate against values of current in amperes as abscissa.

Figure 5:
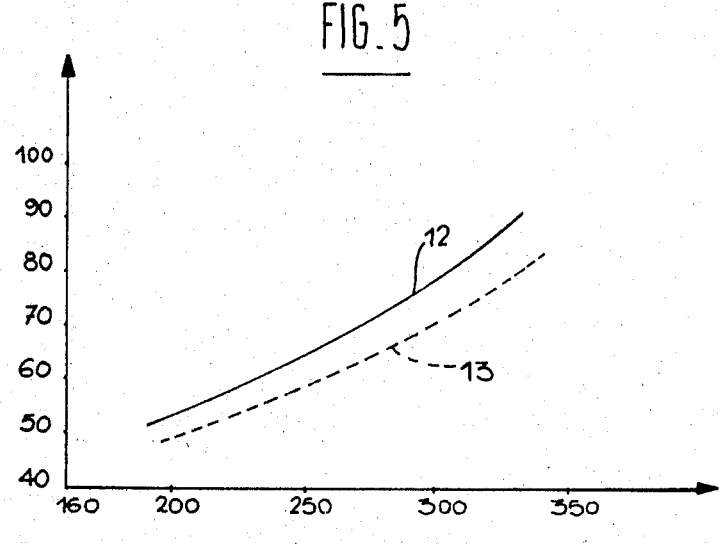

FIGURE 5 plots the number of grams of hot metal deposited per minute as ordinate against welding current in amperes as abscissa.

With basic electrodes of this known type, weld metal can be deposited which has very high mechanical properties. In particular, in the case of carbon steel, weld beads can be deposited having a reduction of area higher than 70% with a superior impact strength at room temperature and at low temperature. The Charpy UF impact strength at plus 20° C. is, for instance, higher than 14 kilogram-meters per square centimeter, and the Charpy V impact strength at minus 30° C. is higher than 3.5 kilogram-meters per square centimeter.

Unfortunately, these values are obtained very inconsistently, desirable values sometimes being replaced by others far worse without changing the operating procedure used in cases where good impact values were obtained.

Furthermore, these known basic electrodes are practically usable only for welding of chamfered plates in butt welding position with V joints. If one attempts to weld a vertical plate to a horizontal plate by means of these electrodes, the weld fillet is irregular from one location to another. Instead of getting a cross section shaped substantially as a triangle, the weld fillet shows in the middle of its width a more or less prominent ridge. Furthermore, the vertical plate often shows a reduction in thickness just above the weld fillet. This reduction in thickness is generally called an undercut.

The known basic electrodes also have the disadvantage of melting more slowly than electrodes having a neutral or acidic coating. Finally, the removal of slag which they deposit is generally difficult, especially when the angle of the chamfer in which the weld metal is deposited is less than 90°.

To remedy the difficulties caused by these basic electrodes, it has been proposed to reduce the coefficient of basicity of the coating by incorporating in it relatively large quantities of oxides of acidic character such as, for example, $TiO_2$ and $ZrO_2$. For instance, basic electrodes were manufactured with a coefficient of basicity lower than 1.5 and this resulted in a drop in mechanical properties of the weld-deposited metal. In the case of carbon steel, the reduction of area may drop to 55%, and the Charpy UF impact strength at plus 20° C. may fall to 12 kilogram-meters per square centimeter, while the Charpy V impact strength at minus 30° C. is often less than 3.5 kilogram-meters per square centimeter.

Another serious disadvantage of these electrodes is the very wide spread found in the impact strength values. It is not infrequent to observe that the Charpy V impact strength at minus 30° C. ranges from 1 to 20 kilogram-meters per square centimeter for specimens taken from weld fillets obtained with electrodes picked up from the same package.

The present invention concerns a welding electrode which does not have the disadvantage of the known electrodes having a coefficient of basicity higher than two, while it possesses all advantages of the latter.

The basic electrode, according to the invention, is characterized by a coating which possesses simultaneously the following proporties:

(1) It contains enough metallic powder to give the electrode an efficiency higher than 150%.

(2) Its outside diameter is at least 1.9 times its core diameter.

(3) Among the compounds with a basic chemical function which it contains, there are more magnesium compounds than the sum of the other basic alkaline earth and alkali compounds.

Such an electrode deposits a weld metal having very high mechanical properties because the coefficient of basicity is higher than two. It permits welding a vertical plate to a horizontal plate by means of a very smooth and even fillet having a cross section which is approximately that of an isosceles triangle with a slightly curved base. Furthermore, the junction of this fillet with the plates is obtained without undercutting. Again, the deposition rate of these electrodes is higher than that of electrodes in which the same coefficient of basicity is obtained entirely or for the greater part from calcium carbonate. Finally, the slag may be removed easily and peels off sometimes by itself.

If in a basic electrode the coefficient of basicity of the coating is higher than two because of a high proportion of magnesium carbonate among all the basic compounds, if the coating does not contain metallic powder, and if the diameter of the coating is such that the amount of slag formed would not be excessive and would not disturb the performance of the welding operation (for example if the diameter of the coating does not exceed 1.6 times the diameter of the metallic core) then the undercutting in the vertical plate will be much too pronounced and the arc will sputter intensely.

These two defects could be progressively reduced by increasing gradually the ratio of the outside diameter of the coating to the core diameter, without introducing metallic powder in the coating which was made basic mainly by the use of magnesium carbonate. But, when the ratio of the diameters would be higher than 1.9, the amount of slag produced would be so great that the welding operation would become very difficult.

If the ratio of diameters were to be increased progressively from 1.6 to 1.9, and if at the same time a progressively larger quantity of metallic powder were introduced into the coating, but without impairing the welding operation by an excessive amount of slag, then the electrode would be improved. However, the undercutting in the vertical plate would remain too pronounced, the arc would still sputter intensely and metal spatter would be thrown outside of the weld pool in too great an amount.

It is only when the amount of metallic powder in the coating is sufficient to give the electrode an efficiency higher than 150%, and when the ratio of the outside diameter of the coating to the core diameter is higher than 1.9, that a basic electrode having a coefficient of basically higher than two obtained chiefly from one or more magnesium compounds of basic function, can be free from the defects which have been mentioned above.

The proportion of magnesium compounds of basic function with respect to other compounds having a basic chemical function should be advantageously at least two.

Preferably almost all the components having a basic chemical function consist of magnesium compounds.

When the statement is made in this specification that the coefficient of basicity is at least equal to two, mainly because of one or more magnesium compounds, this means that the weight of magnesium carbonate and/or magnesium oxide is higher than the weight of other alkaline earth and algali carbonates and/or oxides. It will be noted that magnesium fluoride mentioned below does not contribute to the coefficient of basicity.

The coating of the electrode according to the invention can contain, in addition to silica, acidic oxides such as $TiO_2$ and/or $ZrO_2$, but the proportion of these ingredients must remain relatively low in order for the coefficient of basicity to remain higher than two.

Electrodes according to the invention have advantageously in their coatings mixtures of dry powders of the following compositions, to which a binder was subsequently associated by incorporating a water solution of one or more alkali silicates, in a proportion of 10 to 25%, and preferably 21%, calculated as alkali silicate solution of 35° Baumé on the weight of the drying powder mixture.

The following compositions by weight are given for electrodes having an efficiency of 150%, 200% and 250% approximately:

|  | Efficiency, Percent | | |
| --- | --- | --- | --- |
|  | 150 | 200 | 250 |
| Metallic ingredients | 55–65 | 65–75 | 70–80 |
| Deoxidizers | 6–12 | 6–12 | 6–12 |
| $MgCO_3$ and/or MgO | 10–20 | 7.5–17.5 | 5–15 |
| Fluorides (alkali, alkaline-earth, Mg, Al or cryolite) | 5–10 | 4–8 | 3–6 |
| $TiO_2$, $ZrO_3$ in any form | 0–5 | 0–4 | 0–3 |
| $CaCO_3$ | 0–10 | 0–7.5 | 0–5 |
| Clay, china clay, bentonite, organic materials such as alginate | 0–5 | 0–4 | 0–3 |

Depending on the efficiency desired (150%, 200% or 250%) the paste obtained by mixing the powders with the binder is applied in a thickness such that the ratio of the outside diameter to the core diameter be respectively between 1.9 and 2.2 for 150% efficiency, between 2.1 and 2.4 for 200%, or between 2.3 and 2.6 for 250%.

If the ratio of the outside diameter to the core diameter is near the lower limit indicated for each efficiency, it is advantageous to use magnesium oxide rather than magnesium carbonate and inversely when the said ratio is near the higher limit it is advantageous to use magnesium carbonate.

The metallic powders used will depend obviously on the nature of the weld metal which must be deposited. The amounts of powders of iron, chromium, nickel, molybdenum, tungsten, manganese and/or ferroalloys of these metals must be adapted to the nature of the plates being welded. For instance for the welding of stainless steel containing 18% chromium and 8% nickel by weight, the mixture of powders to be used contains iron, chromium and nickel or powders of iron, ferrochrome and ferronickel.

The deoxidizers may be selected among the ferroalloys such as Fe-Mn, Fe-Si, Fe-Ti and Fe-Si-Ti or among metals such as Mn, Si, Ti, Al, Mg and Ca taken individually or in combination.

For the welding of low carbon steels especially favorable results were obtained with a mixture of dry powders by weight as follows:

|  | Percent |
| --- | --- |
| Iron powder | 69 |
| Fe-Si with 45% Si | 3.5 |
| Fe-Mn with 90% Mn | 5 |
| $MgCO_3$ | 14 |
| $CaF_2$ | 5.5 |
| Bentonite+alginate | 3 |
|  | 100 |

A 35° Baumé water solution of a binder containing 50% of potassium silicate and 50% of sodium silicate by weight was added to this dry mix in the amount of 21% of solution weight based on the dry mixture weight.

To obtain electrodes having a 200% efficiency, the paste so obtained was applied on a low carbon steel wire having a diameter of 5 millimeters in a layer such that the outside diameter was 11.2 millimeters. The ratio of the outside diameter to the core diameter was therefore 2.24.

These electrodes were used with alternating current of 250 to 300 amperes, using power sources developing an open circuit voltage of 76 volts. The melting operation was smooth, spatter was minimal and the slag was easily removable.

In the case of the welding of a vertical plate to a horizontal plate, the fillet had a good appearance, its surface being slightly convex without any ridge. Furthermore, its binding with the plates was good.

In the case of the welding of horizontal plates with a chamfered butt joint leaving between the plates an open V, the bead had a good appearance and was nearly flat.

In both cases the weld bead had the following mechanical properties:

Tensile strength _____ 52 to 55 kg./mm.²
Elongation measured on a specimen having a length equal to 5 times its diameter _____ 26 to 30%.
Charpy UF impact strength at +20° C. _____ Regularly superior to 14 kgm./cm.².
Charpy V impact strength at −30° C. _____ Regularly superior to 35 kgm./cm.².

The drawings accompanying the present specification show the results obtained with the electrode as per the invention.

Figure 1:
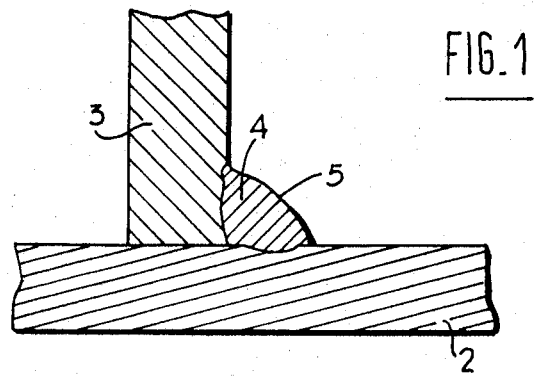
FIGURE 1 is a diagrammatic vertical section showing the first fillet weld applied to a joint between a vertical plate and a horizontal plate by electric arc welding according to the present invention.

FIGURE 1 illustrates a weld fillet obtained between a vertical plate and a horizontal plate by using the 200% efficiency electrode of the composition specified above.

Figure 2:
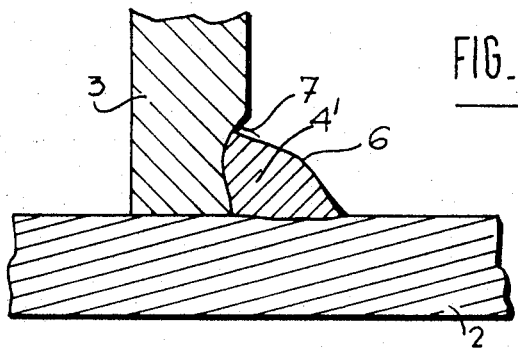
FIGURE 2 is a view similar to FIGURE 1, showing the result of electric welding in accordance with the prior art.

FIGURE 2 illustrates a fillet weld between the same plates as in FIGURE 1 with an electrode differing from the one used in FIGURE 1 solely by replacing the magnesium carbonate in it by the same weight of calcium carbonate.

FIGURES 3, 4 and 5 illustrate separately for an electrode as per the invention and for an electrode having a coefficient of basicity higher than two through the use of calcium carbonate, the curves of arc voltage, melting times expressed in seconds, and deposition rates expressed in grams per minute, all as functions of the intensities of the respective welding currents.

In FIGURE 1 a horizontal plate 2 of low carbon steel is shown after welding to it a vertical plate 3 also of low carbon steel, by means of a fillet weld 4 having a substantially triangular shape and by using the above mentioned 200% efficiency electrode. This figure illustrates exactly the configuration of the weld fillet and of the plates as they appear in a photograph. The good binding between the fillet weld 4 and plates 2 and 3 will be noticed, as well as the absence of any undercutting in plate 3. The surface 5 of this fillet is slightly convex. It is obvious that in practice the welding of plate 2 to plate 3 must be completed by a weld fillet on the other side of plate 3.

In FIGURE 2 the weld fillet 4' is shown as having a high ridge 6 in the middle of its width and a pronounced undercutting 7 in the plate 3.

In FIGURE 3 the abscissae are read in intensities of welding current in amperes while the ordinates show the arc voltage in volts. The solid line curve 8 relates to the electrode as per the invention employed to obtain the weld of FIGURE 1, while the broken line curve 9 relates to the electrode employed to obtain the weld of FIGURE 2. It can be seen that for the same intensity of welding current, the arc voltage is higher in the case of the electrode as per the invention than in the case of the other electrode. The electric power developed in welding is therefore higher in the case of the electrode as per the invention for a given value of current. Therefore, the melting time of a given weight of weld metal is shorter with an electrode as per the invention.

This appears clearly in FIGURE 4 where the values of current are read as abscissae and the time of melting as ordinates. The solid line curve 10 and the broken line curve 11 express the time necessary to deposit 125 grams of weld metal respectively with the electrode as per the invention and the conventional electrode whose basicity is obtained by calcium carbonates.

In FIGURE 5 where the abscissae are still read as values of welding current but where the ordinates express the number of grams of weld metal deposited per minute, it is also clearly established by comparing the solid line curve 12 of the electrode as per the invention to the broken line curve 13 of the basic electrode of known type, that the deposition rate is higher for the electrode as per the invention than for the other one.

In view of my invention and disclosure, variations and modifications to meet individual whim or particular need will doubtless become evident to others skilled in the art to obtain all or part of the benefit of my invention without copying the process and structure shown, and I, therefore, claim all such insofar as they fall within the reasonable spirit and scope of my claims.

Having thus described my invention that I claim as new and desire to secure by Letters Patent is:

1. An electrode having a metallic core and having a basic coating for electric arc welding of a vertical plate and a horizontal plate in alloy or carbon steel, said coating containing magnesium compounds and other basic compounds, said coating having a coefficient of basicity higher than two and containing metallic powder, deoxidizer and fluorinated fluidizer, the coating having the following features:
   (a) Sufficient metallic powder to provide an electrode of an efficiency higher than 150%;
   (b) Outside diameter at least 1.9 times its core diameter;
   (c) Among the compounds having a basic chemical function in the coating there is a greater weight of magnesium compounds that the sum of the weights of other basic alkaline earth and alkali compounds.

2. An electrode of claim 1, in which the weight of basic magnesium compounds of basic chemical function in the coating is at least twice the sum of the weights of other basic alkaline earth and alkali compounds.

3. An electrode of claim 1, in which magnesium compounds perform substantially all of the basic chemical function.

4. An electrode of claim 1, in which the ratio of the above mentioned diameters for electrodes of different efficiencies fall within the limits set by the following table:

| Efficiency, percent— | Ratio of diameters |
|---|---|
| 150 | 1.9–2.2 |
| 200 | 2.1–2.4 |
| 250 | 2.3–2.6 |

5. An electrode of claim 1, having an efficiency of 150%, in which the coating essentially consists of a mixture of dry powders associated with alkali silicate which, during the preparation of the coating, has been added under the form of a water solution at 35° Baumé, in the proportion of 10 to 25% on the weight of said powders, said mixture of dry powders, essentially consisting of 55 to 65% of metallic powder, 6 to 12% of deoxidizer, 10 to 20% of a material of the class consisting of magnesium carbonate, magnesium oxide and mixtures thereof, 5 to 10% of fluoride, a maximum of 5% of a material of the class consisting if titania and zirconia and mixtures thereof, a maximum of 10% of calcium carbonate and a maximum of 5% of a material of the class consisting of clay, china clay, bentonite and organic material, said percentages being by weight.

6. An electrode of claim 1, having an efficiency of 200%, in which the coating essentially consists of a mixture of dry powders associated with alkali silicate which, during the preparation of the coating, has been added under the form of a water solution at 35° Baumé, in the proportion of 10 to 25% on the weight of said powders, the said mixture of dry powders containing 65 to 75% of metallic powder, 6 to 12% of deoxidizer, 7.5 to 17.5% of a material of the class consisting of magnesium carbonate, magnesium oxide and mixtures thereof, between 4 and 8% of fluoride, a maximum of 4% of a material of the class consisting of titania and zirconia and mixtures thereof, a maximum of 7.5% of calcium carbonate and a maximum of 4% of a material of the class consisting of clay, china clay, bentonite and organic material, the above percentages being by weight.

7. An electrode of claim 1, having an efficiency of 250%, in which the coating essentially consists of a mixture of dry powders associated with alkali silicate which, during the preparation of the coating, has been added under the form of a water solution at 35° Baumé, in the proportion of 10 to 25% on the weight of said powders, the said mixture of dry powders containing 70 to 80% of metallic powder, 6 to 12% of deoxidizer, 5 to 15% of a material of the class consisting of magnesium carbonate, magnesium oxide and mixtures thereof, 3 to 6% of fluoride, a maximum of 3% of a material of the class consisting of titania and zirconia and mixtures thereof, a maximum of 5% of calcium carbonate, and a maximum of 3% of a material of the class consisting of clay, china clay, bentonite and organic material, said percentages being by weight.

8. An electrode of claim 1, having an efficiency of 200%, in which the coating essentially consists of a mixture of dry powders associated with alkali silicate which, during the preparation of the coating, has been added under the form of a water solution at 35° Baumé, in the proportion of 21% on the weight of said powders, the said mixture of dry powders essentially consisting of 69% of iron powder, 3.5% of the 45% silicon grade of ferrosilicon, 5% of the 90% manganese grade of ferromanganese, 14% of magnesium carbonate, 5.5% of calcium fluoride and 3% of a material of the class consisting of bentonite, alginate and mixtures thereof, said percentages being by weight.

9. A process of electric arc welding, which comprises assembling a vertical plate and a horizontal plate of alloy or carbon steel to make a joint, and electric arcing to the vertical and horizontal plates at the joint to form a weld bead from a stick electrode having a steel core and having a coating containing magnesium compounds and other basic compounds, the coating being of a cofficient of basicity higher than two and containing metallic powder, deoxidizer and fluorinated fluidizer and the coating having the following combination of features:

(a) Containing enough metallic powder to attain an efficiency of the electrode higher than 150%;
(b) Outside diameter at least 1.9 times its core diameter;
(c) Among the compounds having a basic chemical function in the coating, there is a greater weight of magnesium compounds than the sum of the weights of other alkaline earth compounds and alkali compounds.

10. A process of claim 9, in which the weight of magnesium compounds in the coating is at least twice the weight of the said alkaline earth and alkali compounds.

11. A process of claim 9, in which the basic compounds in the coating are substantially entirely magnesium compounds.

12. A process of claim 9, in which for a given efficiency of electrode, the ratio of diameters above mentioned is within the following range:

| Efficiency, percent— | Ratio of diameters |
|---|---|
| 150 | 1.9–2.2 |
| 200 | 2.1–2.4 |
| 250 | 2.3–2.6 |

13. A process of claim 9, in which the electrode has an efficiency of 150%, the coating essentially consisting of a mixture of dry powders associated with alkali silicate which, during the preparation of the coating, has been added under the form of a water solution at 35° Baumé, in the proportion of 10 to 25% on the weight of the said dry powders, the mixture of dry powders consisting of from 55 to 65% of metallic powder, from 6 to 12% of deoxidizer, from 10 to 20% of a material of the class consisting of magnesium carbonate, magnesium oxide and mixtures thereof, from 5 to 10% of fluoride, a maximum of 5% of a material of the class consisting of titania, zirconia and mixtures thereof, a maximum of 10% of calcium carbonate, and a maximum of 5% of a material of the class consisting of clay, china clay, bentonite and organic material, said percentages being by weight.

14. A process of claim 9, in which the electrode has an efficiency of 200%, the coating consisting of a mixture of dry powders associated with alkali silicate which, during the preparation of the coating, has been added under the form of a water solution at 35° Baumé, in the proportion of 10 to 25% on the weight of said powders, the said mixture of dry powders containing 65 to 75% of metallic powder, from 6 to 12% of deoxidizer, from 7.5 to 17.5% of a material of the class consisting of magnesium carbonate, magnesium oxide and mixtures thereof, from 4 to 8% of fluoride, a maximum of 4% of a material of the class consisting of titania, zirconia and mixtures thereof, a maximum of 7.5% of calcium carbonate and a maximum of 4% of a material of the class consisting of clay, china clay, bentonite and organic material, said percentages being by weight.

15. A process of claim 9, in which the electrode has an efficiency of 250%, the coating consisting of a mixture of dry powders associated with alkali silicate which, during the preparation of the coating, has been added under the form of a water solution at 35° Baumé, in the proportion of 10 to 25% on the weight of said powders, the said mixture of dry powders containing from 70 to 80% of metallic powder, from 6 to 15% of deoxidizer, from 5 to 12% of a material of the class consisting of magnesium carbonate, magnesium oxide and mixtures thereof, from 3 to 6% of fluoride, a maximum of 3% of a material of the class consisting of titania, zirconia and mixtures thereof, a maximum of 5% of calcium carbonate, and a maximum of 3% of a material of the class consisting of clay, china clay, bentonite and organic material, the percentages being by weight.

16. A process of claim 9, in which the electrode has an efficiency of 200%, in which the coating consists of a mixture of dry powders associated with alkali silicate which, during the preparation of the coating, has been added under the form of a water solution at 35° Baumé, in the proportion of 21% on the weight of said powders, the said mixture of dry powders essentially consisting of 69% of iron powder, 3.5% of the 45% silicon grade of ferrosilicon, 5% of the 90% manganese grade of ferromanganese, 14% of magnesium carbonate, 5.5% of calcium fluoride and 3% of a material of the class consisting of bentonite, alginate, and mixtures thereof, said percentages being by weight.

References Cited

UNITED STATES PATENTS

| 1,501,266 | 7/1924 | Brace | 219—146 |
| 2,102,891 | 12/1937 | Faulkner | 219—146 |
| 2,694,023 | 11/1954 | Hopkins | 219—146 X |
| 3,177,340 | 4/1965 | Danhier | 219—146 |

RICHARD M. WOOD, Primary Examiner.

BARRY A. STEIN, Assistant Examiner.

U.S. Cl. X.R.

117—206